Aug. 27, 1935.  A. C. HAMILTON  2,012,449
AIRCRAFT WHEEL
Original Filed June 5, 1931  2 Sheets-Sheet 1

INVENTOR-
Alexander C. Hamilton
BY
ATTORNEY-

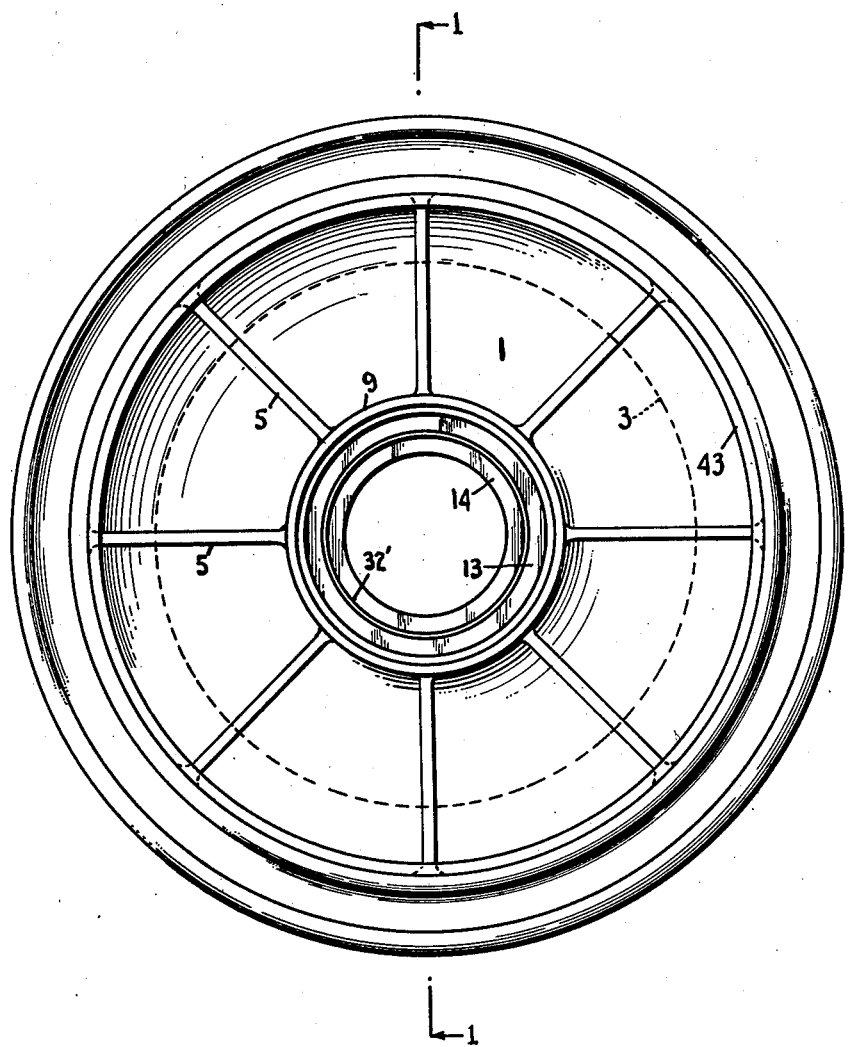

Patented Aug. 27, 1935

2,012,449

UNITED STATES PATENT OFFICE 2,012,449

AIRCRAFT WHEEL

Alexander C. Hamilton, Pleasant Ridge, Mich., assignor, by mesne assignments, to Hayes Industries, Inc., Jackson, Mich., a corporation of Michigan Original application June 5, 1931, Serial No. 542,305. Divided and this application May 2, 1933, Serial No. 668,930

2 Claims. (Cl. 301—5)

This application in one of its aspects relates to wheels shown, by way of example, as applied to aircraft, but it may be applied to various other types of vehicles.

One object of the invention is to produce a wheel having spaced slanting sides with rigid cross vanes, thereby producing a supporting arch of great strength compared to the weight of the wheel.

Another object of the invention is to combine reversely inclined roller bearings beneath the sloping sides of the wheel to take the direct thrust through these sides.

Another object of the invention is to so construct the braking apparatus associated with the wheel and the cover therefor, that there will be ample cooling of the brake band and friction lining.

Another object of the invention is to provide side farings for the wheel to produce a stream line effect and decrease the resistance to movement through the air, in other words, to decrease the windage.

Another object of the invention is to provide arrangements for protecting the bearing from dust and other particles.

Other objects will appear in the following description, reference being had to the drawings, in which:

Fig. 2 is an elevation of the wheel viewed from the left of Fig. 1, with the faring shaft and bearings removed.

Figure 1:
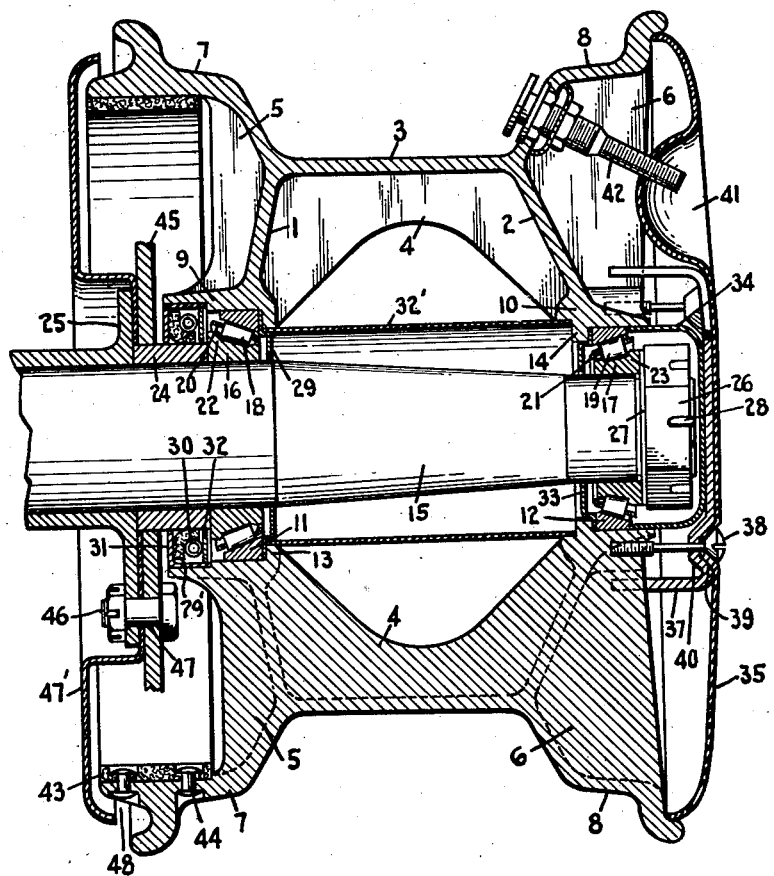
Fig. 1 is a sectional elevation through an airplane wheel, the section being taken on the line 1—1 of Fig. 2.

The foregoing improvements and others will now be described in complete detail.

Referring to the drawings, in Fig. 1 the wheel is preferably cast of some light material such as aluminum alloy so as to have two sides or discs 1, 2, sloping from the axis towards the rim 3. These sides are not joined at the center by the usual hub member. The bracing or arch effect is produced by a plurality of webs 4 cast integrally with the sides. These webs may also extend beyond the sides at 5 and 6 to directly support the edges or discs 7 and 8 of the rim on which the tire, not shown, is positioned. I prefer to arrange these extension vanes 5 and 6 in direct alignment with the internal veins 4 but they may be staggered in relation to the internal veins with like results. Small bearing sections 9, 10, are cast integrally with the sides 1 and 2 to present cylindrical cavities or housing in which outer bearing cones 11 and 12 fit. These bearing cones rest against downturned flanges 13, 14, integral with the cylindrical members 9 and 10. The wheel is adapted to be mounted on an axle 15 preferably of cone shape, as shown. On the larger end of the cone axle is mounted the inner bearing member 16 and on the smaller end of the cone is mounted the inner bearing member 17. A series of rollers 18, 19, which may be either spherical, cylindrical or conical, are placed in the raceway between the bearing members suitably held in spaced relation by cages 20 and 21 of standard construction. The bearing members 16 and 17 have thrust flanges 22, 23, to take the thrust of the rollers.

The inner raceway 16 is adapted to abut against sleeve 24 on the axle 15 which abuts against the flange member 25 fastened to the supporting gear (not shown) of the aircraft.

The inner bearing member 17 is held in position by nut 26 threaded on the reduced end of the shaft 15. A washer 27 is preferably placed between this nut and the bearing member 17. The nut may be of the castellated type held in adjusted position by means of the usual split key 28 threaded through a hole in the shaft.

To prevent dust from entering the bearing of the wheel an inner disc 29 is placed between the outer bearing member 11 and the flange 13. A dust pad 29' held in place by coil spring 30 is enclosed in a cap 31 fitting over ring 32. The end of the cap 31 may be bent inwards to hold the ring 32 in position so that the dust pad and its associated parts may be removed as a unit from which the pad and spring may be removed by pulling inwardly after the assembly is removed from the wheel. The assembly fits inside of the extension 9 and over the sleeve 24. An internal dust sleeve 32' fits inside the flanges 13 and 14 in such a way that it may be removed to the left in Fig. 1 when the wheel is removed from the axle and the bearing and dust cap assembly is removed. Each of the bearing members would be filled with oil or grease and would be retained in place by the dust caps and disc which also act as lubricant containers.

The outer bearing is protected from dust and foreign material by inner disc 33 clamped between the bearing member 12 and the thrust flange 14. Enclosure of the bearing member is provided by dust cap 34 which surrounds the nut 26 and abuts against the bearing member 12 inside the extension 10.

The outer disc 2 of the wheel is enclosed by faring 35 to produce a stream line effect and reduce the windage. This faring fits inside the outer edge of rim 8 and is held in place by screws 36 which clamp the faring against a U-shaped bracket 37. This bracket may have a notch in each of its ends so as to straddle two diametrically opposed vanes 6. Screws 36 have a reduced portion between the threads and the head 38 so that they may be forced through the conical seat 39 in the faring and a similar conical seat 40 in the supporting bracket 37. The hole in these conical seats is made sufficiently small to prevent the threaded portion 36 from dropping out when the faring and supporting bracket are removed from the wheel but yet permit of the threaded portion being forced therethrough by a screw driver. If desired, this hole may be slightly threaded to facilitate the screw being entered.

The faring is stamped with a depression 41 with an appropriate hole therethrough to receive the end of air nipple 42 fastened to the rim 8 and connecting with the inner tube of the tire, not shown. By means of this nipple the tire may be inflated without removing the faring.

The rim portion 7 has a friction brake surface 43 fastened to it by rivets 44 or other appropriate fastening devices. Arranged inside of this portion of the wheel is an anchor plate 45 fastened to the flange 26 by means of appropriate bolts 46 extending through the holes 47. These bolts may have the usual castellated nuts and split keys or the parts may be held in position by riveting and spot welding if desired. The braking apparatus itself is not shown herein, being illustrated and claimed in my copending application Serial No. 542,305 filed June 5, 1931, of which this is a division. The braking apparatus is enclosed by faring 47' shaped as shown and clamped between the torque plate 45 and the flange 26. This faring is spaced from the rim of the wheel at 48 to permit air to flow around the braking parts to cool the braking surface.

During the setting action of the brake (not shown) while the aircraft is landing air is forced through the opening 48 between the faring 47' and the wheel rim and passes around the brake parts to cool them. This is an important feature as the braking effort required to bring an airplane to a standstill is such as to otherwise intensively heat the braking parts.

Having described my invention, what I claim is:

1. In a vehicle wheel, a rim having a drop center, side discs integrally joined to the bottom of the drop center portion and diverging toward the center of the wheel, and a plurality of circumferentially spaced webs extending across between the discs, said webs being integrally joined to the said discs and to the bottom of said drop center portion.

2. In a vehicle wheel, a rim having a drop center bottom and side discs, said side discs being integrally joined to the bottom and diverging outwardly away from the center of the wheel, side discs integrally joined to said bottom and diverging outwardly toward the center of the wheel, a plurality of circumferentially spaced webs extending across between the second mentioned discs, and integrally joined thereto and to the said bottom, bearing housings integrally joined to the second mentioned discs at the central part of the wheel, and a plurality of spaced strengthening vanes extending radially and integrally joining said housings and said discs.

ALEXANDER C. HAMILTON.